UNITED STATES PATENT OFFICE.

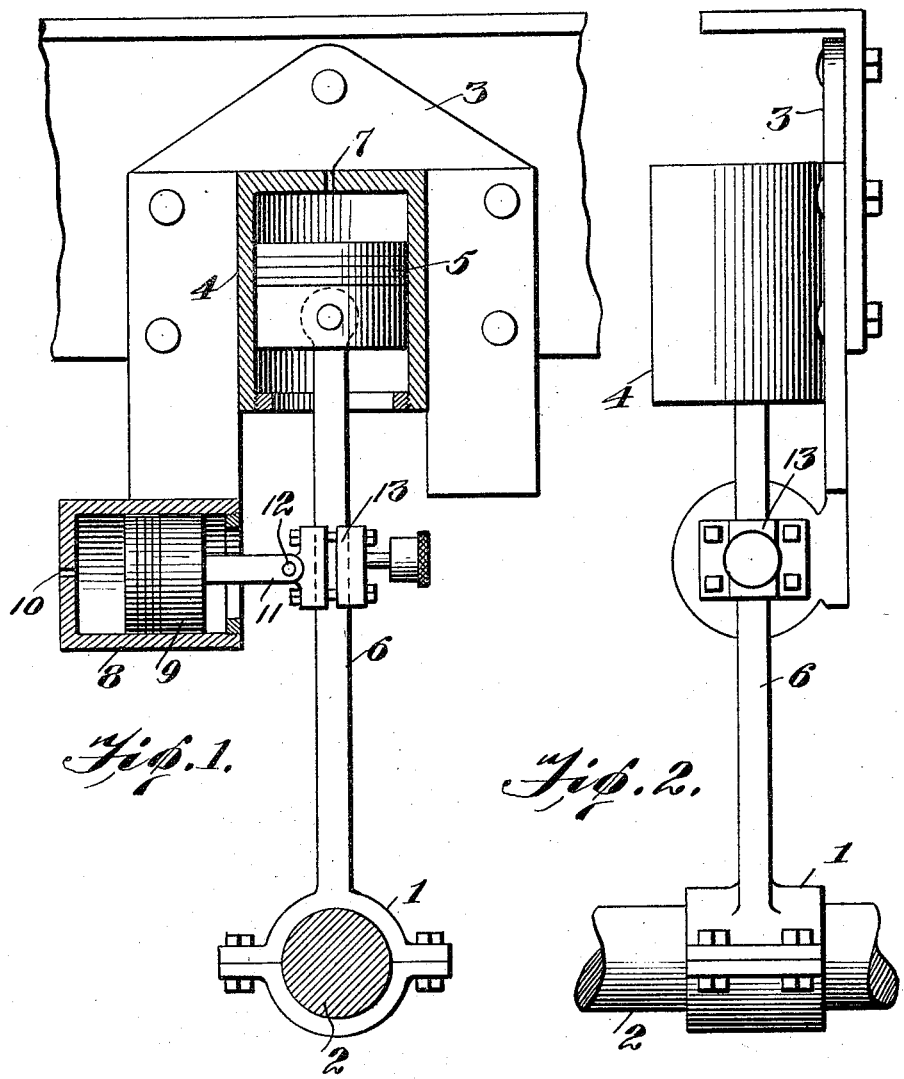

GEORGE M. BICKNELL, OF DETROIT, MICHIGAN, AND HUGH H. C. WEED, OF ST. LOUIS, MISSOURI, ASSIGNORS TO THE CARTER CARBURETER COMPANY, OF ST. LOUIS, MISSOURI, A CORPORATION OF MISSOURI.

FLOATING BEARING.

1,300,559.   Specification of Letters Patent.   Patented Apr. 15, 1919.

Application filed July 15, 1918. Serial No. 245,013.

*To all whom it may concern:*

Be it known that we, GEORGE M. BICKNELL and HUGH H. C. WEED, citizens of the United States, and residing at Detroit, in the county of Wayne, Michigan, and at St. Louis, in the county of St. Louis, Missouri, respectively, have invented certain new and useful Improvements in Floating Bearings, of which the following is a specification.

This invention relates to attachments for bearings adapted for application to rotating shafts, and more particularly to shafts which are subjected to high speed rotation. The primary object of the invention is the prevention of the whipping of shafts.

The generally accepted idea of the so-called whipping is the tendency of high speed shafting to travel, in response to centrifugal force, in a circle larger than the diameter of the shaft. This circular travel is in addition to the rotation of the shaft under applied power. The shafts are ordinarily held in fixed bearings, generally at least two in number, and the portions of the shaft which are subjected to the whipping action are located between the fixed bearings. The circle of travel of the whipping portions would manifestly be around a center which is the center of the shaft when it is at rest. It will be very readily understood that the whipping action is exceedingly destructive to the fixed bearings and to the shaft itself.

As before stated, a whipping shaft travels in a circle larger than its own diameter. Our conception is that any discouragement of the tendency of the shaft to travel in a true circle, by destroying or retarding its continuity of movement, or impulse in a fixed circular direction, will tend to cause the shaft to more nearly assume its normal straight alinement.

The invention is especially adapted for automobile shafting but it is to be clearly understood that it may be advantageously used on any high speed shafts. In automobile drive shafts a very large percentage of the destructive wear on universal joints is occasioned by shaft whipping. This wear has caused the adoption of heavier drive shafts, of abnormal diameter, which manifestly do not whip to so great an extent, because less resilient, but has occasioned a very material increase in cost of production. These heavier shafts are also objectionable in that they add to the burden of the universal joint. With the use of our invention, a long drive shaft of normal diameter will show a smaller degree of whipping tendency, and consequently cause less wear upon the bearings, than will a shaft of the same length and of abnormally large diameter.

We have observed that the whipping action is better retarded by opposing unequal resistance to the tendency of the shaft to swing in a circle. A fixed resistance of the tendency to travel to the left, for instance, should be met by either a greater or less resistance to travel to the right. Moreover, it is obvious that, in order for the shaft to travel in a circular path, the whipping portion must move upwardly and downwardly, at some point in the circle. This resistance may be applied as desired, but it is to be noted that, if equal resistance is moderately applied to movement in all directions, the whipping action will not be entirely eliminated.

Our invention therefore, by providing unequal resistance to shaft movement in different directions, renders a true circular or "whipping" movement impossible, offering at the same time no resistance to the rotative movement within the bearings.

In the accompanying drawings forming a part of this specification, we have illustrated a preferred embodiment of our invention, and have chosen to illustrate the invention applied to the drive shaft of an automobile.

In the drawings—

Figure 1 is a sectional elevation of the device; and

Fig. 2 is a plan view of Fig. 1.

The device preferably comprises a split bearing 1, surrounding the shaft 2, the shaft of course being freely rotatable within the bearing.

Fixed to any convenient portion of the automobile, such as a cross-member, is a bracket 3, adapted to support a dash-pot consisting of a cylinder 4 and a piston 5. The piston 5 is connected in the usual manner to a shaft 6 which is integrally or otherwise secured to the bearing 1. A relief port 7 is provided, preferably as shown.

The bracket 3, as shown in Fig. 2, carries a second dash-pot construction comprising a cylinder 8 having a piston 9. This dash-pot is positioned at an angle to the dash-pot comprised by the cylinder and piston 5, and is of smaller diameter and presents less resistance. A relief port 10 is provided, as shown. To the piston 9 is connected a shaft 11 which is pivotally connected at 12 to a split collar 13 embracing the shaft 6.

From the foregoing it will be clear that we have devised a means for resisting both the lateral and vertical movements of the bearing 1. Both the dash-pots are held rigidly in position on the bracket 3. The shaft 6 is adapted to slide vertically through the collar 13, under impulse furnished by vertical movement of the bearing, but this movement, in either direction, is retarded by the resistance to any vertical movement of the piston 5 within the cylinder 4, in the customary dash-pot manner which is unnecessary to further explain. Any lateral movement of the bearing will cause a similar movement in the same direction to be imparted to the shaft 6, thence to the collar 13, to the shaft 11 and to the piston 9, but this movement will likewise be resisted by the dash-pot composed of the cylinder 8 and piston 9, as will be understood. This resistance however is not as great as that offered by the dash-pot composed of the cylinder 4 and piston 5. Consequently less resistance is opposed to lateral movement of the bearing than is offered to vertical movement thereof.

It is obvious that in actual practice of the invention, lubricating devices, such as oil cups, should be applied to all points where there is frictional contact. Since these devices form no part of our invention, they are not shown in all instances where they would be necessary.

Various modifications of the invention may be suggested to those skilled in the art to which the invention appertains, but we desire to secure by Letters Patent all such embodiments thereof as fall fairly within the scope of the appended claims.

It is obvious that equally good results might be accomplished by mounting the larger dash-pot at the side, and the smaller dash-pot at the top, and the following claims are to be construed accordingly. In this position the larger dash-pot would control the lateral movements of the bearing and the smaller dash-pot would govern the vertical movements.

What we claim is:—

1. A device of the character described comprising, in combination with a rotatable shaft, a floatable bearing engaging the shaft, a dash-pot connected to the bearing and adapted to interpose a pneumatically-cushioned resistance to vertical movement thereof, and a supplemental dash-pot adapted to resist lateral movement of the bearing in either direction.

2. A device of the character described comprising, in combination with a rotatable shaft, a floatable bearing engaging the shaft, of means presenting pneumatically-cushioned resistance to vertical movement of the bearing and other means presenting a similar resistance to a less degree to lateral movement of the bearing.

In testimony whereof we affix our signatures.

GEORGE M. BICKNELL.
HUGH H. C. WEED.

Copies of this patent may be obtained for five cents each, by addressing the "Commissioner of Patents, Washington, D. C."